United States Patent [19]

Müller et al.

[11] 3,966,548

[45] June 29, 1976

[54] COOLING SYSTEM FOR A NUCLEAR REACTOR

[75] Inventors: Klaus Müller, Grossdechsendorf; Bernhard Böhm, Erlangen, both of Germany

[73] Assignee: Siemens Aktiengesellschaft, Munich, Germany

[22] Filed: Feb. 15, 1973

[21] Appl. No.: 332,737

[30] Foreign Application Priority Data

Feb. 19, 1972 Germany............................ 2207870

[52] U.S. Cl.................................. 176/37; 176/38
[51] Int. Cl.²........................................... G21C 9/00
[58] Field of Search .................... 176/37, 38, 31, 32

[56] References Cited
UNITED STATES PATENTS

| | | | |
|---|---|---|---|
| 3,115,450 | 12/1963 | Schanz................................ | 176/37 |
| 3,190,805 | 6/1965 | Straub................................. | 176/30 |
| 3,423,286 | 1/1969 | Weems................................ | 176/38 |
| 3,431,168 | 3/1969 | Kjemtrup............................. | 176/37 |
| 3,865,688 | 2/1975 | Kleimola............................. | 176/37 |

*Primary Examiner*—Stephen C. Bentley
*Assistant Examiner*—Ralph Palo
*Attorney, Agent, or Firm*—Kenyon & Kenyon Reilly Carr & Chapin

[57] ABSTRACT

A nuclear reactor cooling system in which the cooling system for cooling a fuel element well is combined with the after-cooling system used at shutdown, and the emergency cooling system resulting in a substantial reduction in the number of cooling system elements required thereby reducing the overall cost of the cooling system. The fuel element well contains an excess of coolant which may then be used, in case of a break in the primary cooling circuit to supply emergency coolant to the reactor. In addition the pump and some of the lines of the fuel well cooling system are shared with the after cooling system resulting in a further reduction of components.

6 Claims, 4 Drawing Figures

COOLING SYSTEM FOR A NUCLEAR REACTOR

BACKGROUND OF THE INVENTION

This invention relates to nuclear reactor cooling systems in general and more particularly to an improved cooling system which, through sharing of various elements, substantially reduces the overall cost of the cooling system.

In a typical nuclear reactor a plurality of various cooling circuits are generally provided. First there is the primary circuit in which coolant flows between the reactor and the steam generators. In this circuit, water is supplied to the reactor where it is heated and the steam generated therefrom in the steam generators, is used to drive power generating equipment, after which the water is pumped back to the reactor. A second type of cooling circuit is that used for cooling fuel elements which have been removed from the reactor core. Even after removal from the core, these fuel elements continue to give off heat and radiation. Thus they are generally placed in a cooling well where they are submerged in a coolant which is continually recirculated to remove the heat generated by the fuel elements.

A third type of cooling system found in reactors is the after cooling system or shutdown cooling system which is used to cool the core after shutdown. Since, at this time, the primary circuit is no longer in operation the residual heat in the reactor must be removed by a separate shutdown cooling system which circulates coolant through the reactor until it is completely cooled. As a safety measure there is also required in reactors an emergency cooling system which will supply coolant to the reactor should one of the primary coolant lines break. Associated with this there may also be a sprinkler system which is used to condense the steam from the primary circuit or that generated when the coolant escaping from a break comes in contact with the hot areas of the reactor and turns to steam.

In each of these systems or circuits there are of course a great number of elements such as piping, control valves, check valves, pumps, etc. Thus if portions of these systems can be effectively combined a substantial reduction of system elements and thus a reduction in overall system cost will result.

Summary of the Invention

The present invention realizes such a substantial reduction in system elements by combining portions of the fuel element cooling system, the after-cooling system and the emergency cooling system. The system is designed for use in a nuclear reactor system which is contained within a protective enclosure. It makes use of the fact that the well, in which the fuel elements are submerged under water, and which is within the protective enclosure, will have a pressure exerted on its surface when a break in the system occurs. What this means is that the coolant may be removed from the well and pumped into the primary circuit in which the break occurred without having to overcome a large differential pressure. The well is designed to have a capacity greatly in excess of that required to cover the fuel elements stored therein. Thus, when a break occurs in the primary cooling system, it is possible to pump the excess coolant from the well through the same pump used in cooling the well, into the primary coolant system to provide the necessary emergency cooling. Since in connecting the cooling system in this fashion the fuel element well cooling circuit is already coupled into the primary cooling circuit, it is also possible to use this same pump and the same lines to provide after cooling through the reactor when it is shut down.

Other features shown include a choke in the lines to the fuel element well that, even under emergency conditions, a certain amount of the coolant is still supplied to the fuel well to assure that cooling therein is maintained. In addition a sump is formed in the bottom of the protective enclosure in which the reactor is situated permitting the lost coolant and condensed coolant to be collected and restored to the emergency cooling circuit. In this way a very effective combined system which uses a single pump and many common lines and valves to provide fuel element well cooling emergency cooling and after cooling is provided.

Detailed Description of the Preferred Embodiment

Figure 1:
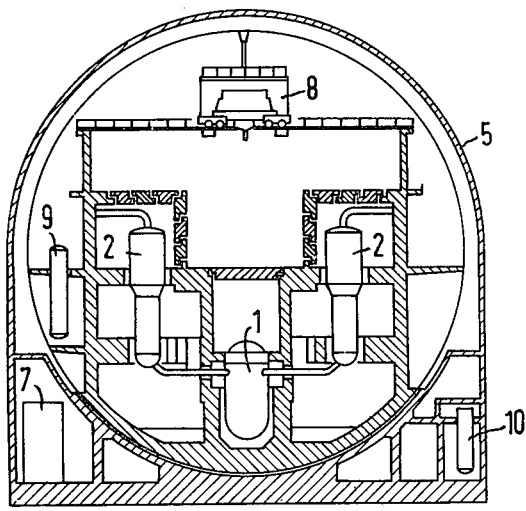
FIGS. 1 and 2 are cross sectional elevation views of the reactor within a protective enclosure showing the physical positioning of the various reactor elements.
Figure 2:
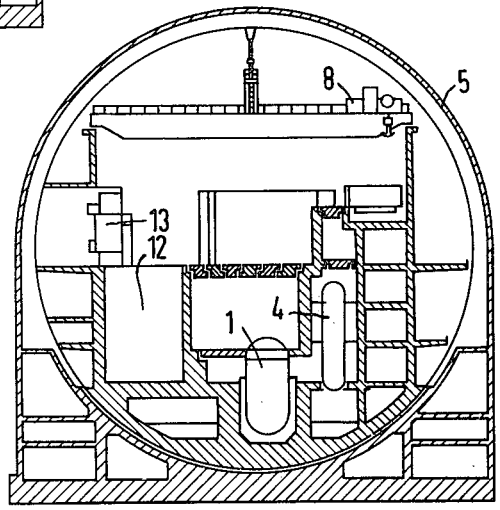
Figure 3:
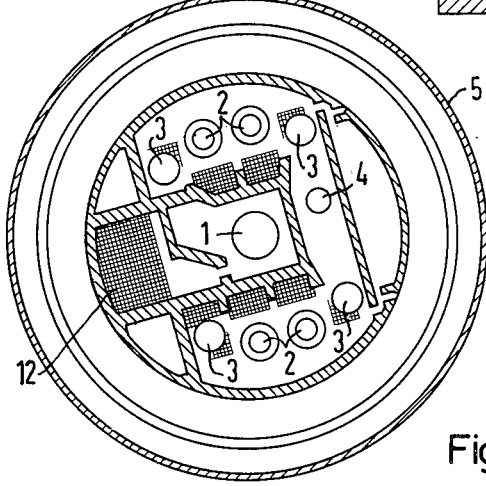
FIG. 3 is a cross sectional plan view of the reactor of FIGS. 1 and 2.

On FIGS. 1, 2 and 3 the various elements of the reactor and their physical relationship within a steel enclosure 5 are shown. Within the steel enclosure 5 are the pressurized nuclear reactor tank 1 containing the reactor core, the steam generators 2 which are coupled to the reactor and the main feed pumps 3, which supply the coolant to the reactor after passing through the steam generating system. Also contained within the enclosure 5 are pressure stabilizers 9 and pressure reservoirs 4. In addition there is a crane 8 used for servicing the nuclear reactor along with a charging machine 13 used for transferring fuel elements from the reactor 1 into a fuel element well 12 the top of the well 12 being open to the interior of the steel enclosure 5. Within the fuel element well 12, fuel elements are stored under water to provide cooling and to prevent the escape of radiation. Outside of the container 5, there is shown a flooding tank 7 which contains an aqueous solution of boric acid and a post heat exchanger 10.

Figure 4:
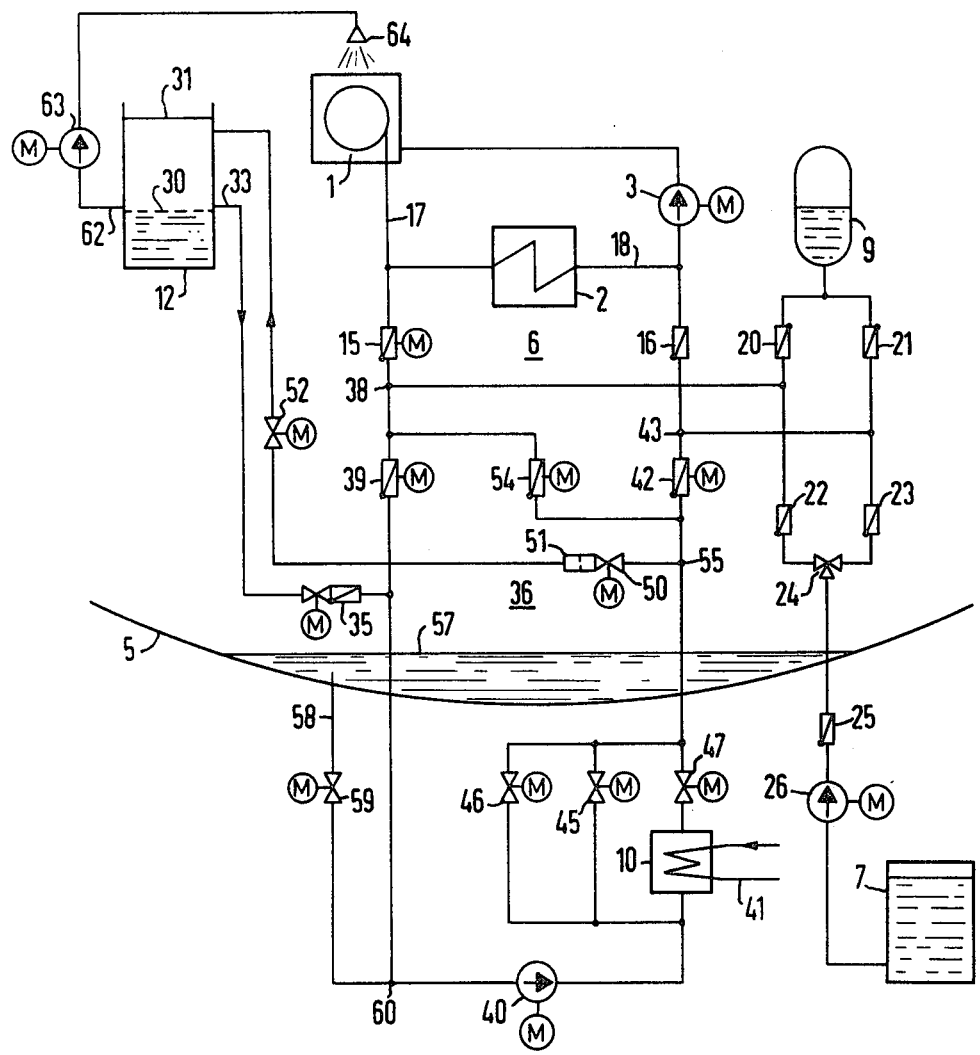
FIG. 4 is a schematic diagram of the preferred embodiment of the cooling system of the present invention.

The preferred embodiment of the cooling system of the present invention is illustrated in schematic form on FIG. 4. As shown thereon, the primary cooling circuit comprises the nuclear reactor 1, the steam generators 2 and the pump 3 which is driven by an electric motor. In normal operation, the coolant will be supplied to the reactor by pump 3 where it will be heated and be provided, on the hot side 17, to the steam generators 2 and then on the cold side 18, back to feed pump 3. A pressure tank 4 provides a supply of coolant to the primary cooling circuit to make up for any losses suffered therein. The pressurized reservoir 4 is coupled to the primary cooling circuit through check valves 15 and 16. In normal operation, if the pressure drops in the primary cooling circuit due to loss of coolant, coolant will be supplied by a check valve 16 to the pump 3 to make up for this loss. Two additional check valves 21 and 20 are provided on the two lines from the reservoir 4 to prevent coolant from flowing out of the other parts of the system to the reservoir should a break occur in the vicinity of the reservoir 4. Connected to the primary cooling circuit through the connections to the reservoir 4 is the boric acid flooding tank 7. This is part of the emergency cooling system and is used for flooding the reactor with boric acid if a break occurs within the primary cooling circuit. It is used in conjunction with the additional emergency cooling to be described below. When operated, a pump 26 pumps the boric acid solution from the tank 7 through a check valve 25, thence through a two way valve 24, through check valves 22 and 23 and then to the points 43 and 38 which are connected respectively to the hot and cold sides of the main coolant circuit through the check valves 15 and 16.

As noted above, when the reactor is shut down, after-cooling must be provided. The after cooling circuit comprises the pump 40 which is motor driven as indicated, a heat exchanger 10 (which has a coolant provided to it over lines 41 in conventional fashion), the valve 47, check valve 42, check valve 16, pump 3, the reactor 1, check valve 15, and check valve 39. When after cooling is desired the motor driven valves 47, 42, 39 and 15 are opened. Pump 40 is started and pumps coolant through the heat exchanger 10 and thence around the above described circuit cooling the reactor. The motor driven valves 45 and 46 can be used to cause some or all of the coolant to bypass the heat exchanger 10 and may thus be used to maintain control over the temperature of the coolant being cycled.

The pump 40 serves the additional purpose of providing cooling for the fuel element well 12. Hot coolant from the well 12 is provided over line 33 through a motor controlled valve and a check valve 35 to point 60 from which it is pumped by the pump 40 through the heat exchanger 10 and the valve 47 to point 55. From here it passes through the motor driven valve 50 having a bypass choke 51 then through another motor driven valve 52 and back into the well 12. The coolant in the well is normally maintained at the level indicated as 31 with the level 30 being the minimum level required to cover the fuel elements. The outlet pipe 33 is located a short distance above level 30, for example ½ yard, so that in no case will the liquid level fall below that required to cover the fuel elements and shield them.

Because it is designed to contain an excess of coolant, and because of the manner in which pipe 33 is placed the well 12 can also serve as a source of emergency coolant. In normal operation, the pressure in the primary cooling circuit will be exerting a force which holds the check valves 39 and 42 closed. When an emergency situation arises because of a break in the primary coolant system, the speed of the pump 40 may be increased to pump coolant from the well 33 through the valves 42 and 54 and 15 into the cold and hot sides respectively of the primary coolant circuit to provide additional flooding to cool down the reactor. To assure that the fuel elements are still cooled under these conditions the choke 51 is designed so as to allow a portion, between one/fifth and one half of the output of pump 40, to be supplied to the well 12, with the remaining, major portion of the coolant being used for emergency cooling to cool reactor 1.

The coolant supply in the well 12 can further be used to supply sprinklers 64 located above the reactor within the enclosure 5. The line 62 to the sprinklers 64 is connected to well 12 through a pump 63 which will be started up when sprinkling is required. The line 62 has the same vertical location with respect to level 30 as line 33 to prevent uncovering the fuel elements located within the well 12. The sprinkler 64 helps to condense the steam which is escaping and being generated due to the break in the primary cooling circuit line. Coolant from the sprinkler and coolant and steam escaping from the break will collect in a sump portion 57 of the enclosure 5. This portion is connected via a line 58 through a motor driven valve 59 to point 60 where it can be fed back into the pump 40 and reused.

It will be recognized that under normal operating conditions the pressure within the primary cooling circuit 6 will greatly exceed the pressure developed by pump 40 in the after cooling and well cooling circuit. However, when a break in the primary cooling system occurs the pressure within the steel enclosure 5 will tend to be equal to whatever pressure remains within the primary cooling circuit. This pressure will be exerted on the open well 12, providing pump 40 with a head of pressure which makes it possible for the pump to force water into the primary coolant circuit without substantial effort.

Thus by placing the fuel element well within the same enclosure as the reactor and by making the well sufficiently large that it can store an extra amount of coolant, the well cooling circuit can be easily cross connected with the primary cooling circuit to provide emergency cooling in case of break in the main coolant line. With little further modification the same basic system which cools the well can also be used to provide after-cooling on shutdown. And, by careful placement of the outlet from the fuel element well and the use of a choke to divide the flow between the well and the reactor under emergency and/or after cooling conditions, this can be accomplished without sacrificing the protection in the cooling of the fuel element well.

For simplicity, only a single branch of the combined cooling system has been shown. In practice, to provide additional safety, a plurality of circuits would be provided with at least two separate circuits being coupled to the well 12 and at least two circuits to provide emergency cooling to the primary cooling circuit. It should further be noted, that even if a separate emergency cooling system is provided, which cooling system would normally have multiple parallel circuits, savings can still be obtained by replacing one of the multiple circuits with the arrangement of the present invention. It is also possible to only combine two of the three functions illustrated and still obtain savings. For example, only well cooling and after cooling might be combined or only well cooling and emergency cooling combined. Since in either one of these cases there is still a reduction by one in the number of separate circuits that must be provided the system will still be more economical than those presently in use.

Thus, a cooling system for a nuclear reactor which permits extensive sharing among the fuel element well cooling circuit, the after cooling circuit and the emergency cooling circuit thereby substantially reducing the overall cooling system cost has been shown. Although a specific embodiment has been illustrated and described it will be obvious to those skilled in the art that various modifications may be made without departing from the spirit of the invention which is intended to be limited solely by the appended claims.

What is claimed is:

1. A reactor installation comprising a pressure containment enclosure enclosing a normally closed main cooling circuit comprising a pressurized-water reactor pressure vessel and means for cooling and for circulating pressurized-water coolant through said vessel, and a fuel-element storage well in said enclosure for storing used hot fuel elements removed from said vessel, said well having an open top exposed to the atmosphere inside of said enclosure, said installation having circulating means for circulating fuel-element cooling water through said well while maintaining at least a fuel-element-covering water level in the well; wherein the improvement comprises said fuel-element storage well containing an excess of said fuel-element cooling water extending upwardly to a height substantially above said fuel-element covering level, and a supplemental circuit comprising means for pumping at least a portion of said excess of said fuel-element cooling water from said well into said main cooling circuit to provide this main cooling circuit with supplemental coolant, said supplemental circuit connecting with said well above said level to pump from said well at most only said excess water into said main cooling circuit by means of said circulating pump.

2. The installation of claim 1 having an emergency cooling system comprising a supply of emergency water and means for pumping the emergency water from said supply into said main cooling circuit, and a normally closed valve connecting said supplemental circuit with said system so that through this system said supplemental coolant supply can be provided to said main cooling circuit to supplement said emergency water.

3. The installation of claim 1 in which said circulating means is formed by a circulation circuit including, in series, said well and a circulating pump drawing from the well and a heat-exchanger and a normally open valve controlling flow to said well, and said supplemental circuit includes a normally closed valve forming a connection from said circulation circuit, between said heat-exchanger and said normally closed valve, to said main cooling circuit.

4. The installation of claim 3 in which said normally closed circuit includes means for passing a choked flow past said normally open valve when the latter is closed, to maintain circulation in said well.

5. The installation of claim 3 having valved means for connecting said circulation circuit in series circuit with said main cooling circuit to form an after-cooling system when said main cooling circuit is not functioning.

6. The installation of claim 3 in which said enclosure contains a sump having an open top exposed to the atmosphere inside of said enclosure and positioned below said main cooling circuit, said coolant collecting in said sump in the event the main cooling circuit opens to release the coolant, and means for connecting said circulating pump to draw from said sump.

* * * * *

UNITED STATES PATENT AND TRADEMARK OFFICE
CERTIFICATE OF CORRECTION

PATENT NO. : 3,966,548
DATED : June 29, 1976
INVENTOR(S) : Klaus Müller et al

It is certified that error appears in the above-identified patent and that said Letters Patent are hereby corrected as shown below:

Col. 2, line 41: after "fuel element well 12" insert --,--;

Col. 5, line 7 (claim 1): after "means" insert --including a circulating pump--.

Signed and Sealed this

Twenty-eighth Day of December 1976

[SEAL]

Attest:

RUTH C. MASON
*Attesting Officer*

C. MARSHALL DANN
*Commissioner of Patents and Trademarks*